(No Model.)
E. P. WATROUS.
Well Boring Apparatus.
No. 235,319. Patented Dec. 7, 1880.
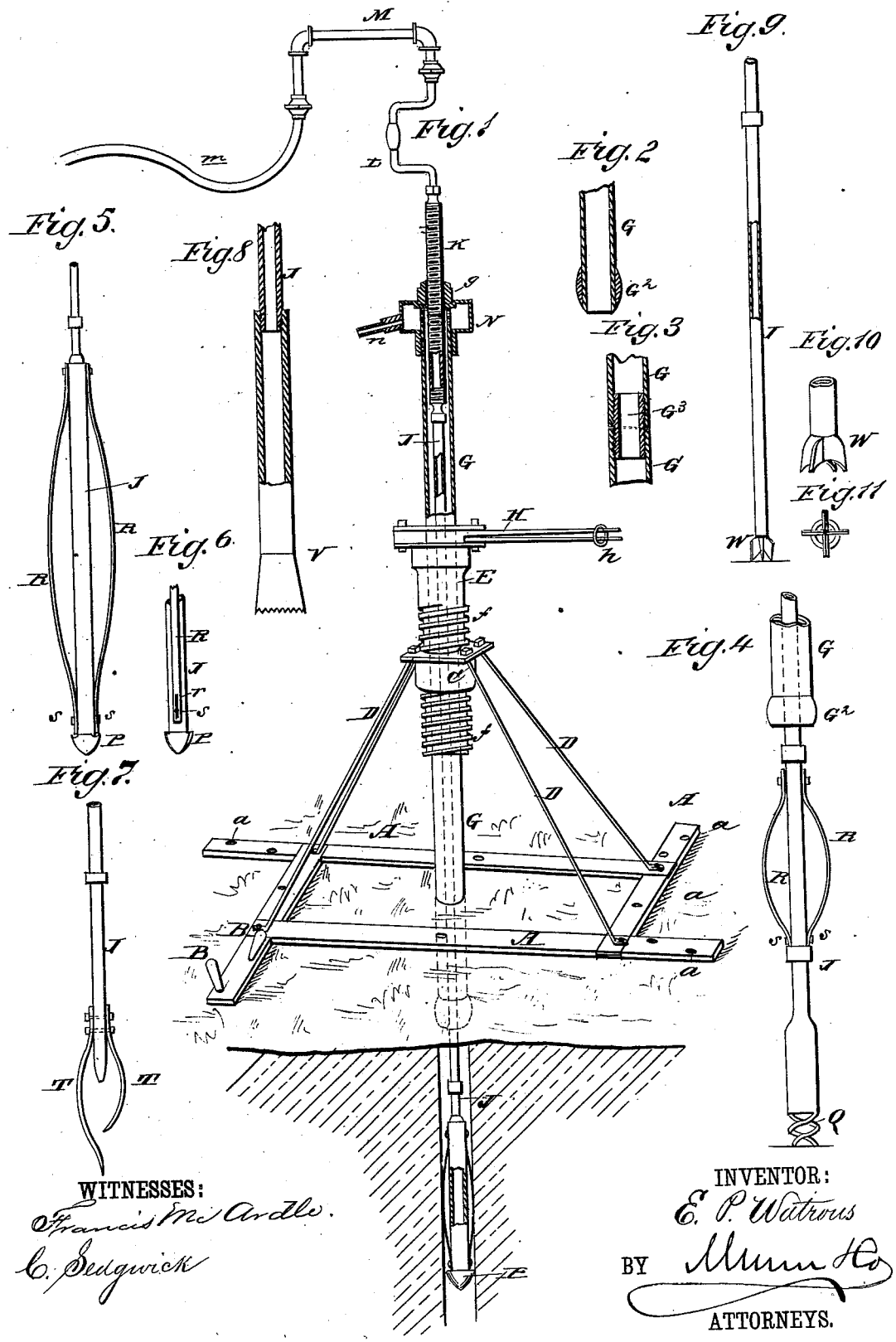
WITNESSES:
Francis McArdle
C. Sedgwick
INVENTOR:
E. P. Watrous
BY Munn & Co
ATTORNEYS.

UNITED STATES PATENT OFFICE.

EDGAR P. WATROUS, OF MORAVIA, NEW YORK.

WELL-BORING APPARATUS.

SPECIFICATION forming part of Letters Patent No. 235,319, dated December 7, 1880.

Application filed July 19, 1880. (No model.)

*To all whom it may concern:*

Be it known that I, EDGAR P. WATROUS, of Moravia, in the county of Cayuga and State of New York, have invented a new and useful Improvement in Well-Boring Apparatus, of which the following is a specification.

My invention relates to wells which are formed by driving or otherwise sinking a metal tube.

In the accompanying drawings, Figure 1 is a perspective view, partly in section, of an apparatus illustrating the manner of carrying out my invention. Figs. 2 to 11, inclusive, are detail views, hereinafter referred to.

Similar letters of reference indicate corresponding parts.

A represents a frame consisting of sills, which are placed flat upon the ground and secured thereto by stakes B driven diagonally through holes $a$ in said sills. From the frame A rise diagonal braces D, having their lower ends secured to said sills and their upper ends attached to a nut, C. In the nut C works a sleeve, E, having a screw-thread, $f$, on its exterior, which thread engages with the thread of the nut. In the sleeve E works a pipe, G, which constitutes the well-tube. At the top of the sleeve E is arranged a pair of pipe-tongs, H, which have their arms pivoted to said sleeve, and are so arranged that their jaws will clamp the pipe G when the arms of the tongs are brought together, so as to cause said pipe G to turn with said sleeve E when it is rotated by means of the tongs H, the arms of which, being held together by a link, $h$, serve as a lever. This rotation of the sleeve E and pipe G, by reason of the engagement of the thread $f$ with the nut C, causes the pipe G to bore into the ground and serve as the well-tube.

To facilitate this boring the lower end of the pipe G is provided with a steel collar, $G^2$, fitted on the outside thereof, and sharpened to a cutting-edge, as shown in Fig. 2. When it is necessary to splice the pipe G it may be done by means of an internal screw-threaded coupling, $G^3$, as shown in Fig. 3. Inside the pipe G works the boring-rod, which consists of a pipe, J, of less diameter than the inside of said pipe G, so as to allow it to work freely therein with a space between it and the outer pipe. To the lower end of the boring rod or pipe J the drill or boring-tool is attached, and to its upper end is attached a section of pipe, K, having a screw-threaded exterior, which works in a nut, $g$, at the upper end of the pipe G.

To the upper end of the threaded section K is attached a hollow crank, L, in form resembling an ordinary bit-stock, such as is used for boring wood by hand. The upper end of this hollow crank or bit-stock is connected with a pipe, M, and a hose, $m$, leading from a force-pump. At the upper end of the pipe G is a chamber, N, provided with a spout, $n$. The lower end of the boring rod or pipe J is provided with openings or perforations communicating with the space between it and the pipe G, and the upper end of the pipe G is provided with openings or perforations communicating with the chamber N.

In using this apparatus the boring-tool works in advance of the lower end of the pipe G. The boring is done by turning the crank L. A stream of water from a force-pump passes through the hose $m$, pipe M, hollow crank L, and pipe or boring-rod J to the lower end of the latter, where it enters the space between said boring-rod and the pipe G, and is forced upward in said space to the chamber N and spout $n$, thus bringing up from the bottom of the bore the drillings, borings, and refuse. When the boring has proceeded sufficiently the pipe G is forced down, as before described. The link $h$ is then removed, so as to loosen the jaws of the tongs H and allow the sleeve E to turn independently of the pipe G. The tongs are then moved in a reverse direction, so as to cause the sleeve E to rise by turning in the nut C until the desired height is reached, when the pipe G is again clamped by the jaws of the tongs, as before described, and is in position for another downward movement.

Drills or boring-tools of any suitable description may be employed in connection with this apparatus, by attaching them to the lower end of the boring rod or pipe J.

In Figs. 1, 5, and 6, a drill or boring-tool, P, is shown, which is used for boring through clay.

In Fig. 4 is shown a tool, Q, used for boring in loose soil.

In Figs. 1, 4, 5, and 6 a cutting-tool is shown, consisting of two elastic blades, R, attached to the boring rod or pipe J, diametrically opposite each other. The upper end of each blade R is riveted to the pipe J, and the lower portion is provided with a slot, r, through which passes a stud, s, by which means the blades are allowed to lie flat against the rod or pipe J when passing down the pipe G, and to expand after reaching beyond the lower end of said pipe, so as to cut a chamber larger than the bore of the pipe G.

In Fig. 7 is shown a modification of the cutting-blades, above described. In this case the blades T are riveted to the rod or pipe J at their upper ends, and their lower ends are free.

In Fig. 8 is shown a drill used for working in hard rock. The tool V has its face or cutting-surface serrated.

In Figs. 9, 10, and 11 is shown tool W, used for boring through gravel. This tool is provided with two blades or cutting-edges crossing each other at right angles, as shown in Fig. 11, and each having a concave edge, as shown in Figs. 9 and 10, so that in striking a loose stone or pebble the tool will not be deflected from a vertical line.

Having thus described my invention, I claim as new and desire to secure by Letters Patent—

In a well-boring apparatus, the combination, with a nut, C, supported by braces D on frame A, of the sleeve E, having exterior thread, $f$, the well-tube G, the tongs H, the boring-pipe J, and the threaded pipe-section K, working in nut $g$, as and for the purpose specified.

EDGAR P. WATROUS.

Witnesses:
G. H. McGEER,
DEXTER S. EATON.